United States Patent
Sato et al.

(10) Patent No.: US 8,014,126 B2
(45) Date of Patent: Sep. 6, 2011

(54) ELECTRONIC DEVICE AND PRODUCTION METHOD THEREOF

(75) Inventors: Shigeki Sato, Nikaho (JP); Keiichi Fukuda, Oyama (JP)

(73) Assignee: TDK Corporation, Tokyo (JP)

( * ) Notice: Subject to any disclaimer, the term of this patent is extended or adjusted under 35 U.S.C. 154(b) by 670 days.

(21) Appl. No.: 11/922,697

(22) PCT Filed: Jun. 23, 2006

(86) PCT No.: PCT/JP2006/312643
§ 371 (c)(1),
(2), (4) Date: Sep. 5, 2008

(87) PCT Pub. No.: WO2006/137533
PCT Pub. Date: Dec. 28, 2006

(65) Prior Publication Data
US 2009/0195960 A1    Aug. 6, 2009

(30) Foreign Application Priority Data
Jun. 24, 2005   (JP) .................................. 2005-185749

(51) Int. Cl.
*H01G 4/06*   (2006.01)

(52) U.S. Cl. ............... 361/321.4; 361/321.2; 361/321.5; 361/311; 361/313; 361/306.1; 501/137; 501/138; 501/139

(58) Field of Classification Search ............... 361/321.4, 361/321.5, 321.2, 303–305, 308.1, 309, 311–313, 361/306.1, 306.3; 501/137–139
See application file for complete search history.

(56) References Cited

U.S. PATENT DOCUMENTS

| | | | | |
|---|---|---|---|---|
| 6,510,040 B1* | 1/2003 | Sato et al. | ................. | 361/321.4 |
| 6,559,084 B1* | 5/2003 | Fujikawa et al. | ............. | 501/139 |
| 6,764,976 B2* | 7/2004 | Kobayashi et al. | .......... | 501/139 |
| 6,777,363 B2* | 8/2004 | Park et al. | ..................... | 501/139 |
| 6,809,052 B2* | 10/2004 | Horie et al. | ................... | 501/138 |
| 6,917,513 B1* | 7/2005 | Kim et al. | ................. | 361/321.2 |
| 2002/0013213 A1 | 1/2002 | Sato et al. | | |
| 2003/0125193 A1 | 7/2003 | Kobayashi et al. | | |

FOREIGN PATENT DOCUMENTS

| | | |
|---|---|---|
| CN | 1330371 A | 1/2002 |
| CN | 1424991 A | 6/2003 |
| JP | A 06-005460 | 1/1994 |
| JP | B2 07-118431 | 12/1995 |
| JP | A 2001-052952 | 2/2001 |
| JP | B2 3287980 | 6/2002 |

* cited by examiner

*Primary Examiner* — Nguyen T Ha
(74) *Attorney, Agent, or Firm* — Oliff & Berridge, PLC (57) ABSTRACT

Electronic device 1 comprises an element body 10, comprising a dielectric layer 2 constituted by a dielectric ceramic composition, and a terminal electrode 4, formed outside of the element body 10. The dielectric ceramic composition comprised a main component including barium titanate; a first subcomponent including at least one oxide of Mg and Ca; a second subcomponent including $SiO_2$; a third subcomponent including at least one oxide of Mn and Cr; and a fourth subcomponent including an oxide of rare earth elements, wherein the net valence of Mn and/or Cr in the third subcomponent is 2.2 to 2.4. According to the electronic device 1, both high temperature accelerated lifetime characteristics and capacity stress aging characteristics can be improved in a balanced manner.

14 Claims, 1 Drawing Sheet

FIG. 1

ELECTRONIC DEVICE AND PRODUCTION METHOD THEREOF

TECHNICAL FIELD

The present invention relates to a dielectric ceramic composition, an electronic device and a method of production thereof. The present invention further particularly relates to an electronic device excellent with a proper balance in high temperature accelerated lifetime characteristics and capacity stress aging characteristics, and a method of production thereof.

BACKGROUND ART

A dielectric ceramic composition comprised of glass components having main constituent of $BaTiO_3+MgO+$(transition metal MnO, $Cr_2O_3$)+rare earth ($Y_2O_3$, $Dy_2O_3$, $Ho_2O_3$, $Er_2O_3$)+$SiO_2$, which is a dielectric ceramic composition with high permittivity and flat capacitance-temperature characteristics, is used as a multilayer ceramic capacitor satisfying X7R, X5R or B characteristics (Patent Article 1 (Japanese examined patent publication H7-118431), for example).

A multilayer ceramic capacitor is produced by mixing dielectric materials with organic binder+solvent to produce a green sheet, electrode printing, stacking, firing, annealing and forming terminal electrode (Cu baking). Since Ni is used as an internal electrode, the multilayer ceramic capacitor is fired within the range not to reduce electrode and dielectric body when firing and annealing. On the other hand, when forming terminal electrode (using Cu in general), sintering is performed in a reduced atmosphere not to oxidize internal electrode and Cu. Then finally, Ni plating and Sn plating give the end product.

In such a multilayer ceramic capacitor, it is required to be excellent with a proper balance in both high temperature accelerated lifetime characteristics and capacity stress aging characteristics. High temperature accelerated lifetime characteristics indicates lifetime based on a test performed at high temperature and under high voltage; and longer the lifetime is, superior the durability is. Also, capacity stress aging characteristics indicates change in capacitance with time when applying direct electric field for a long time; smaller change is more preferable.

Cu baking conditions have been unknown to improve both of these characteristics.

DISCLOSURE OF INVENTION

Problem to be Solved by the Invention

An object of the present invention, completed reflecting such a situation, is to provide an electronic device excellent with a proper balance in high temperature accelerated lifetime characteristics and capacity stress aging characteristics, and a method of production thereof.

Means for Solving the Problem

The present inventors newly found the following as a result of keen examination to attain the above purpose. Namely, it was found that an atmosphere to form a terminal electrode consisting of Cu, etc., by baking, influences high temperature accelerated lifetime and capacity stress aging in a multilayer ceramic capacitor.

Cu baking temperature is close to an annealing temperature of dielectric, but it has been considered that there is a few effects on electric property since the sintering time is short. However, it has been found that a dielectric body is reduced and oxidized due to an atmosphere at Cu baking, which results in changing high temperature accelerated lifetime and capacity stress aging.

The present inventors paid attention to the net valence of transition metal to understand the reduction and oxidation of the element body at Cu baking, and found that the net valence can determine the reduction and oxidation states of the element body. Normally, sintering at a low temperature for a short time, such as Cu terminal baking, is not at thermodynamic equilibrium, and the oxidation and reduction have to be considered kinetically, so that it is very difficult to control temperature and atmosphere.

It was found that it is possible to control oxidation and reduction of a multilayer ceramic capacitor by controlling the net valence of transition metal of an element body even in heat treatment at a low temperature for a short time such as that at Cu baking.

Namely, an electronic device according to the first aspect of the present invention comprises an element body having a dielectric layer composed of dielectric composition, and a terminal electrode formed on an exterior of said element body, wherein said dielectric constituent comprises main component including barium titanate;

a first subcomponent including at least one oxide of Mg and Ca;

a second subcomponent including $SiO_2$;

a third subcomponent including at least one oxide of Mn and Cr among transition metals; and a fourth subcomponent including oxide of rare earth elements;

wherein the net valence of Mn and/or Cr among said third subcomponent is in the range of 2.2 to 2.4.

In the present invention, the net valence indicates an apparent valence (a value calculated based on each content of transition metal with different net valence). For example, the net valence of Mn in the third subcomponent can be calculated by an equation:

$$[Mn^{2+} \text{ amount (mol \%)} \times (+2) + Mn^{3+} \text{ amount (mol \%)} \times (+3)]/100.$$

Note that mol % in the above equation is a ratio when a total amount of Mn atoms ($Mn^{2+}$ and $Mn^{3+}$) included in the third subcomponent constitutes 100 mol %.

Too small net valence of Mn and/or Cr causes reduction condition, which is not preferable due to a great amount of oxygen defect. On the other hand, too large net valence of Mn and/or Cr frequently causes oxidation of internal electrode and cation defect (Ba defect), which is not preferable due to deteriorating of aging characteristics and/or lifetime characteristics.

Also, when using oxides of transition metals other than Mn and/or Cr, such as oxides of Co, Ni and Fe, as the third subcomponent, both lifetime characteristics and aging characteristics tends to deteriorate. This is because any of the transition metals other than Mn and/or Cr tends to be in lower net valence (+2) states.

An electronic device according to the second aspect of the present invention comprises an element body having an dielectric layer composed of dielectric composition, and a terminal electrode formed on an exterior of said element body, wherein said dielectric constituent is comprises main component including barium titanate;

a first subcomponent including at least one oxide of Mg and Ca;

a second subcomponent including $SiO_2$;

a third subcomponent including at least one oxide of Mn and Cr; and a fourth subcomponent including oxide of rare earth elements; wherein at least one of an element Mg and Ca included in said first component is set to Xl, an element included in said fourth subcomponent in said rare earth element is set to Re, and when a mole ratio of Xl, Mn and Cr mole number compared to a mole number of Re is expressed in (Xl+Mn+Cr)/Re, the (Xl+Mn+Cr)/Re is larger than 0.7 and equal to or less than 4.2. More preferably, (Xl+Mn+Cr)/Re is more than 0.7 and 2.6 or less, furthermore preferably 1.05 to 2.6.

Xl, Mn and Cr act as an acceptor, and Re acts as a donor. Therefore, too small (Xl+Mn+Cr)/Re is not preferable since there are many donors to easily cause reduction. On the other hand, too large (Xl+Mn+Cr)/Re is not preferable since aging characteristics and/or lifetime characteristics deteriorate due to a great amount of oxygen defect caused by presence of many acceptors.

Also, when using oxides of transition metals other than Mn and/or Cr, such as oxides of Co, Ni and Fe, as the third subcomponent, both lifetime characteristics and aging characteristics tends to deteriorate.

Preferably, a ratio of said first subcomponent to said fourth subcomponent compared to 100 moles of said main component is;

the first subcomponent: larger than 0.1 mole and smaller than 1.5 moles (note that a number of moles of the first subcomponent is the number of moles converted in each element), the second subcomponent: 1 to 3 moles, the third subcomponent: larger than 0.1 mole and smaller than 0.75 mole (note that a mole number of the third subcomponent is the number of moles converted in each element), the fourth subcomponent: larger than 0.1 mole and smaller than 1.5 moles (note that a mole number of the fourth subcomponent is the number of moles converted in each rare earth elements).

When the content of the first subcomponent including at least either oxide of Mg and Ca is too small, temperature change rate of capacitance may become larger, or high temperature accelerated lifetime may deteriorate. On the other hand, too large content causes deterioration in high temperature accelerated lifetime.

When the content of the second subcomponent including $SiO_2$ is too small, capacitance-temperature characteristics deteriorates, and IR (insulation resistance) tends to decline as well. On the other hand, too large content tends to cause sharp decline of permittivity as well as insufficient IR lifetime. The second subcomponent mainly acts as a sintering auxiliary agent, and has effects to improve fraction defective of a primary insulation resistance when making layers thinner.

When the content of third subcomponent including at least either oxide of Mn and Cr is too small, a dielectric layer tends to become a semiconductor. On the other hand, too large content may result in deterioration of capacitance-temperature characteristics. The third subcomponent has an effect to prevent a dielectric layer from becoming a semiconductor by improving resistance to reduction, an effect to increase IR and an effect to improve high temperature accelerated lifetime.

The fourth subcomponent has effects to shift Curie temperature to the high temperature side and to flatten capacitance-temperature characteristics. When the content of the fourth subcomponent is too small, these effects becomes insufficient to cause to deteriorate capacitance-temperature characteristics. On the other hand, too large content tends to deteriorate sinterability. Preferably, the rare earth element in said fourth subcomponent is selected from at least one of Y, Dy, Ho, and Er since are highly effective on improving characteristics.

Preferably, a glass composition of said second subcomponent is expressed in a chemical formula $MxSiO_3$, which M from said chemical formula includes at least one from Ba, Ca, Sr, Li, and B, and x is in the range of ⅔ to 2.

Preferably, an internal electrode layer and said dielectric layer are stacked alternately inside said element body, and an arbitrary pair of said internal electrode layer facing each other via said dielectric layer are connected to each of said pair of terminal electrode formed on the external of said element body. Conductive material included in the internal electrode layer is, although not particularly limited, for example, base metal such as Ni or Ni alloy.

A method of production of an electronic device according to the present invention comprises steps of:

firing said element body, annealing said element body after firing.

Preferably, the temperature of firing said element body is 1100~1350° C., further preferably 1240 to 1260° C., and an oxygen partial pressure in a firing atmospheric gas is larger than $1.67 \times 10^{-14}$ atm and smaller than $9.97 \times 10^{-10}$ atm. Furthermore preferably, oxygen partial pressure in the firing atmospheric gas is $1.18 \times 10^{-13}$ atm to $7.90 \times 10^{-11}$ atm.

Too low firing temperature is not preferable due to reducing sintered density and easily oxidizing the sintered body while too high temperature is not preferable due to grain growth and deteriorated aging. Too low oxygen partial pressure when firing is not preferable since the net valence of Mn and/or Cr tends to become excessively small to reduce lifetime. On the other hand, too high oxygen partial pressure tends to increase the net valence of Mn and/or Cr and to deteriorate aging characteristics.

Preferably, the temperature when annealing said element body is 900 to 1100° C., and the oxygen partial pressure of annealing atmospheric gas is larger than $5.43 \times 10^{-8}$ atm and smaller than $3.12 \times 10^{-6}$ atm, further preferably $3.05 \times 10^{-7}$ to $1.34 \times 10^{-6}$ atm.

When annealing temperature is too low, the net valence of Mn and/or Cr tend to become too small, resulting in reduced lifetime. On the other hand, too high annealing temperature tends to cause increasing the net valence of Mn and/or Cr, reducing lifetime and deteriorating aging characteristics.

When oxygen partial pressure in the annealing atmospheric gas is too low, the net valence of Mn and/or Cr tends to become too small, resulting in reduction of IR lifetime. On the other hand, too high oxygen partial pressure in the annealing atmospheric gas tends to increase the net valence of Mn and/or Cr, to reduce lifetime and to deteriorate aging.

Preferably, the terminal electrode is formed by applying a terminal electrode paste and bake on to the external of said element body after annealing step. It is preferable to mix Cu or Cu alloy powders in the terminal electrode paste.

Preferably, said terminal electrode paste contains Cu powders and glass composition.

Preferably, the temperature of baking after applying the terminal electrode paste is 700 to 850° C. When the baking temperature is too low, it may be hard to form terminal electrode; while too high temperature causes oxidation of Ni in the internal electrode and Cu in the terminal electrode.

Preferably, a partial pressure oxygen of atmospheric gas is larger than $0.1 \times 10^{-6}$ atm and smaller than $10 \times 10^{-16}$ atm when baking after applying the terminal electrode paste. More preferably, oxygen partial pressure in the atmospheric gas at baking processing is $1 \times 10^{-6}$ atm to $5 \times 10^{-6}$ atm. Further preferably, oxygen partial pressure in the atmospheric gas at baking processing is $1 \times 10^{-6}$ atm to $2 \times 10^{-6}$ atm. When the oxygen partial pressure is too low, the net valence of Mn and/or Cr tend to become too low, resulting in reduced lifetime. Too high oxygen partial pressure tends to cause increased net valence of Mn and/or Cr and deteriorated aging characteristics.

The hydrogen concentration in the atmospheric gas is 0.03 to 0.2 vol %, more preferably 0.06 to 0.2 vol %, when baking after applying the terminal electrode paste. When hydrogen concentration is too high, the net valence of Mn and/or Cr tend to become too low, resulting in reduced lifetime. On the other hand, too low hydrogen concentration tends to cause increased net valence of Mn and/or Cr and deteriorated aging characteristics.

BEST MODE FOR WORKING THE INVENTION

Hereinafter, the present invention will be described based on the embodiment shown in the drawing.

Figure 1:
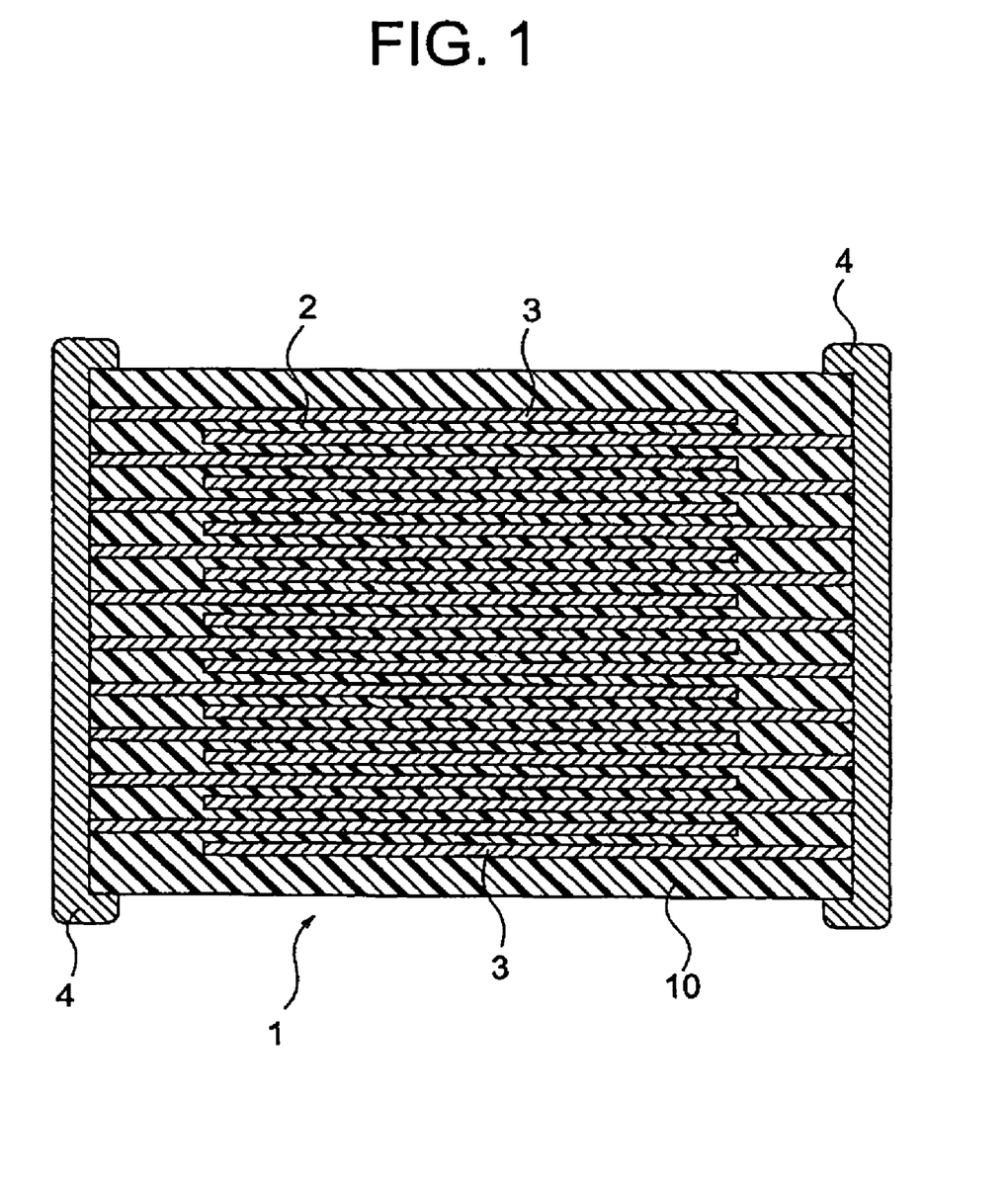
FIG. 1 is a cross-sectional view of a multilayer ceramic capacitor according to an embodiment in the present invention.

In the present embodiment, a multilayer ceramic capacitor 1 shown in FIG. 1 is used as an example of electronic devices to explain its constitution and method of production.

Multilayer Ceramic Capacitor

As shown in FIG. 1, a multilayer ceramic capacitor 1 as an electronic device according to an embodiment of the present invention comprises a capacitor element body 10 wherein dielectric layers 2 and internal electrode layers 3 are alternately stacked. The capacitor element body 10 has both end portions wherein a pair of terminal electrodes 4, each conducting with internal electrode layer 3 alternately stacked inside the element body 10, is formed. The internal electrode layers 3 are stacked so as to alternately expose each of their end faces to the surfaces of two facing end portions of the capacitor element body 10. The pair of terminal electrodes 4 are formed at both end portions of the capacitor element body 10, and connected to the exposed end faces of the alternately stacked internal electrode layer 3 to constitute capacitor circuit.

Outer shape and dimension of the capacitor element body 10 is not particularly limited, and can be properly modified in accordance with usage. Normally, the outer shape is approximately rectangular parallelepiped; and the approximate dimension is 0.4 to 5.6 mm in length, 0.2 to 5.0 mm in width and 0.2 to 1.9 mm in height.

Dielectric Layer

The dielectric layer 2 includes a dielectric ceramic composition according to the present invention. The dielectric ceramic composition of the present invention comprises:

a main component including barium titanate (preferably expressed in a composition formula $Ba_mTiO_{2+m}$, where m is $0.995 \leq m \leq 1.010$ and a ratio of Ba and Ti is $0.995 \leq Ba/Ti \leq 1.010$);

a first subcomponent including at least one oxide of Mg and Ca;

a second subcomponent including glass components;

a third subcomponent including at least one oxide of Mn and Cr; and a fourth subcomponent including oxide of rare earth elements.

In the present invention, the net valence of Mn and/or Cr in the third subcomponent is in a range of 2.2 to 2.4. Also, (Xl+Mn+Cr)/Re is larger than 0.7 and equal to or less than 4.2. wherein at least one of elements Mg and Ca included in the first component is set to Xl, the rare earth element included in the fourth subcomponent is set to Re, and a mole ratio of Xl, Mn and Cr mole number compared to a mole number of Re is expressed in (Xl+Mn+Cr)/Re. (Xl+Mn+Cr)/Re is more preferably larger than 0.7 and equal to or less than 2.6, furthermore preferably 1.05 to 2.6. On the other hand, Xl may be more than one element selected from Mg and Ca. Also, Re may be more than one rare earth element.

The first subcomponent (MgO, CaO, BaO and SrO) has an effect to flatten capacitance-temperature characteristics. Particularly, MgO, which has effects to increase high temperature accelerated lifetime and to improve TC bias characteristics as well, is preferably an essential component in the first subcomponent.

A content of the first subcomponent including at least one oxide of Mg and Ca is more than 0.1 mole and less than 1.5 moles, preferably 0.3 to 1 mole with respect to 100 moles of the main component, when calculated as a conversion mole ratio of each element.

When the content of the first subcomponent is too small, capacitance-temperature change rate may be larger, and high temperature accelerated lifetime tends to deteriorate. On the other hand, too large content causes to deteriorate high temperature accelerated lifetime.

Preferably, glass component as the second subcomponent can be expressed by a chemical formula, $M_xSiO_3$, wherein M is at least one of Ba, Ca, Sr, Li and B and x is in a range of ⅔ to 2.

More preferably, the above second subcomponent is expressed by $(Ba, Ca)_xSiO_{2+x}$ (note that x=0.7 to 1.2). BaO and CaO in $[(Ba, Ca)_xSiO_{2+x}]$, more preferable aspect of the second subcomponent are included in the first subcomponent as well. However, the composite oxide, $(Ba, Ca)_xSiO_{2+x}$, is lower in melting point and better in reactivity to the main component, thus it is preferable to add BaO and/or CaO in the form of the above composite oxide in the present invention. x in $(Ba, Ca)_xSiO_{2+x}$ as more preferable aspect of the second subcomponent is preferably 0.7 to 1.2, more preferably 0.8 to 1.1. When x is too small, i.e., too many $SiO_2$ is included, the second subcomponent may react with the main component $BaTiO_3$ to deteriorate dielectric property. On the other hand, too large x is not preferable since melting point becomes high to deteriorate sinterability. Note that a ratio of Ba and Ca is any, and either on of them may be included.

A Content of the second subcomponent is preferably 1 to 3 moles, further preferably 2 to 3 moles with respect to 100 moles of the main component, when calculated as a conversion mole ratio of each oxide.

When the content of second subcomponent composed of the glass component is too small, capacitance-temperature characteristics may deteriorate and IR (insulation resistance) tends to decline. On the other hand, too large content tends to cause insufficient IR lifetime and sharp reduction of permittivity. The second subcomponent mainly acts as a sintering auxiliary agent, and has effects to improve primary fraction defective of insulation resistance when making layers thinner.

At least one oxide of Mn and Cr in the third subcomponent has effects to inhibit the dielectric layer from becoming a semiconductor by increasing resistance to reduction, to increase IR and to improve high temperature accelerated lifetime.

A content of the third subcomponent is preferably more than 0.1 mole and less than 0.75 mole, further preferably 0.25 to 0.5 mole with respect to 100 moles of the main component, when calculated as a conversion mole ratio of each element.

When the content of the third subcomponent including at least one oxide of Mn and Cr is too small, a dielectric layer tends to become a semiconductor. On the other hand, too large content may cause to deteriorate capacitance-temperature characteristics. The third subcomponent has effects to inhibit the dielectric layer from becoming a semiconductor by increasing resistance to reduction, to increase IR and to improve high temperature accelerated lifetime.

The fourth subcomponent has effects to shift Curie temperature to the high temperature side and to flatten capacitance-temperature characteristics. The rare earth element in the fourth subcomponent is preferably at least any one of Y, Dy, Ho and Er, which are highly effective on improving characteristics. Note that oxides of other rare earth may be included in the fourth subcomponent. The fourth subcomponent has, as well as the third subcomponent, effects to improve increasing resistance to reduction and high temperature accelerated lifetime and aging.

A content of the fourth subcomponent is preferably more than 0.1 mole and less than 1.5 moles, further preferably 0.25 to 1 mole with respect to 100 moles of the main component, when calculated as a conversion mole ratio of each element. When the content of the fourth subcomponent is too small, the above effects may be insufficient, and capacitance-temperature characteristics may deteriorate. On the other hand, too large content tends to deteriorate sinterability.

The dielectric ceramic composition constituting the dielectric layer 2 may include, for example, the following subcomponents as other subcomponent:

for example, a fifth subcomponent including at least one selected from $V_2O_5$, $MoO_3$ and $WO_3$;

a sixth subcomponent including $CaZrO_3$ or $CaO+ZrO_2$; and a seventh subcomponent including $Al_2O_3$.

$V_2O_5$, $MoO_3$ and $WO_3$ as the fifth subcomponent has effects to flatten capacitance-temperature characteristics above Curie temperature and to increase IR lifetime.

$CaZrO_3$ as the sixth subcomponent has effects to shift Curie temperature to the high temperature side and to flatten capacitance-temperature characteristics. In addition, it has effects to improve CR product and DC dielectric breakdown strength. A form of $CaZrO_3$ when adding is not particularly limited, and there may be mentioned oxides constituted by Ca such as CaO, carbonate such as $CaCO_3$, organic compounds, $CaZrO_3$, etc. A ratio of Ca and Zr is not particularly limited, and may be determined not to dissolve in $BaTiO_3$ as the main component. A mole ratio of Ca to Zr, (Ca/Zr), is preferably 0.5 to 1.5, more preferably 0.8 to 1.5, and further preferably 0.9 to 1.1.

$Al_2O_3$ as the seventh subcomponent has effects to improve IR temperature dependency with small effect on capacitance-temperature characteristics.

In the present description, each oxide constituting the main component and each subcomponent is expressed by stoichiometric composition, but oxidation state of each oxide can deviate from the stoichiometric composition. Note that the above ratio of each subcomponent is calculated by converting amounts of metal included in oxides constituting each subcomponent to amounts of oxides of the above stoichiometric composition.

An average particle size of the dielectric ceramic composition of the present invention is not particularly limited, and may be suitably determined, e.g., in a range of 0.1 to 0.4 μm, according to a thickness of the dielectric layer.

The thickness of the dielectric layer constituted by the dielectric ceramic composition of the present invention is normally 0.5 to 3 μm, preferably 0.5 to 2 μm and more preferably 1 to 2 μm, per layer. Since the dielectric ceramic composition of the present invention has the above described constitution, it is possible to obtain such a thin dielectric layer.

The dielectric ceramic composition of the present invention is useful for improving capacitance-temperature characteristics of a multilayer ceramic capacitor comprising such a thin dielectric layer. Note that the number of stacked dielectric layers is normally 2 to 300 or so.

The dielectric ceramic composition of the present invention is suitable for multilayer ceramic capacitor 1 having a specific permittivity of 1000 or more, capacitance-temperature characteristics to satisfy X5R characteristics of EIA standard (−55 to 85° C., ΔC=within ±15%), an internal electrode constituted by Ni and a terminal electrode constituted by Cu.

Internal Electrode Layer

Conductive materials included in the internal electrode layer 3 are not particularly limited, and base metals can be used since constituent materials of the dielectric layer 2 has resistance to reduction. A base metal used as a conductive material is preferably Ni or Ni alloy. As Ni alloy, an alloy of Ni with at least one selected from Pt, Re, Os and Zr is preferable; and Ni content in the alloy is preferably 95 wt % or more.

Note that Ni or Ni alloy may include a variety of minor components such as P in an amount of about 0.1 wt % or less.

The thickness of the internal electrode layer may be suitably determined in accordance with usage, and is normally 0.5 to 5 μm, particularly preferably 0.5 to 1.5 μm or so.

Terminal Electrode

The terminal electrode 4 is normally a multilayer structure composed of at least 2 layers. The most inner layer is formed by a baking method of a terminal electrode paste including at least one selected from Cu, Ni and their alloys.

In a constitution of the inner layer, Cu may include a glass component. The glass component is not particularly limited in constitution, and is composed of, for example, silicate glass, borosilicate glass, alumina-silicate glass, phosphate glass, etc. The glass may include an additive such as fluoride, CaO, BaO, MgO, ZnO, PbO, $Na_2O$, $K_2O$ and $MnO_2$ if needed. The thickness of the inner layer is not particularly limited, and preferably 1.0 to 80 μm or so.

On an outside of the inner layer, a plated layer is formed, for example, by plating processing. The plated layer can be formed by using either of a dry method such as sputtering or a wet process performed in a plating fluid. The known wet process, specifically electrolytic plating process or nonelectrolytic plating process, can be used, and the electrolytic plating process is preferable.

The plated layer is normally formed on the outside of the inner layer in an order of Ni followed by Sn, or Ni followed by Sn—Pb solder plating. Particularly, considering of environments, it is preferable to form the plated layer in an order of Ni followed by Sn. Cu plated film can be formed before Ni plating. The thickness of the plated layer in the terminal electrode 4 is not particularly limited, and normally 0.1 to 20 μm or so in total.

Method of Production of Multilayer Ceramic Capacitor

A multilayer ceramic capacitor using the dielectric ceramic composition of the present invention is produced, as with conventional multilayer ceramic capacitors, by forming a green chip by a normal printing method or sheet method using a paste to fire, and printing or transferring a terminal electrode thereon to fire. Hereinafter, the method of production will be specifically described.

First, dielectric ceramic composition powder for a dielectric layer paste are prepared to process to a paste, resulting in a dielectric layer paste.

The dielectric layer paste may be either organic paste, wherein the dielectric ceramic composition powder and organic vehicle, or water-based paste.

As dielectric ceramic composition powder, the above-mentioned oxide, mixture thereof, or composite oxide can be used. In addition, there may be used a variety of compounds to become the above-mentioned oxide or composite oxide by firing such as carbonate, oxalate, nitrate, hydroxide and organic metal compounds by suitably selecting and mixing. A content of each compound in the dielectric ceramic composition powder is determined to become the above-mentioned constitution after firing.

An average particle size of the dielectric ceramic composition powder is 0.1 to 0.4 μm or so before processing to a paste.

The organic vehicle is obtained by dissolving a binder in an organic solvent. The binder used for the organic vehicle is not particularly limited, and may be suitably selected from a variety of common binders such as ethyl cellulose and polyvinyl butyral. Also, the organic solvent used is not particularly limited, and may be suitably selected from a variety of organic solvents such as terpineol, butyl carbitol, acetone and toluene in accordance with a method employed such as a printing method or sheet method.

Also, when making the dielectric layer paste a water-based paste, water-based vehicle obtained by dissolving water-soluble binder, dispersant, etc. in water may be kneaded with the dielectric materials. The water-soluble binder used for the water-based vehicle is not particularly limited, for example, polyvinyl alcohol, cellulose, water-soluble acrylic resin, etc. can be used.

An internal electrode layer paste can be prepared by kneading the above-mentioned conductive materials consisting of a variety of dielectric metals and alloys, or a variety of oxides, organic metal compounds, resinates, etc., to be the above-mentioned conductive materials after firing, with the above-mentioned organic vehicle.

A terminal electrode paste can be prepared as with the above-mentioned internal electrode layer paste.

A content of the organic vehicle in each of the above-mentioned pastes is not particularly limited, and may be a normal content, e.g., about 1 to 5 wt % of binder and about 10 to 50 wt % of solvent. Also, each paste can include additives selected from a variety of dispersants, plasticizers, dielectric bodies, insulators, etc., if needed. It is preferable to set the total content of these additives to 10 wt % or less.

When employing the printing method, the dielectric layer paste and internal electrode layer paste are printed to stack layers on a substrate such as PET to obtain a multilayer body. After cutting in a predetermined shape, the multilayer body is removed from the substrate to obtain a green chip (an element body before firing).

Also, when employing the sheet method, a green sheet is formed by using the dielectric layer paste; the internal electrode layer paste is printed thereon; and these sheets are stacked to obtain a multilayer body. The multilayer body is cut in a predetermined shape to obtain a green chip (an element body before firing).

Prior to firing, the green chip is subject to binder removal processing. The binder removal processing can be suitably determined in accordance with a kind of the conductive material in the internal electrode layer paste. When using base metal such as Ni and Ni alloy as a conductive material, an oxygen partial pressure in binder removal atmosphere is preferably $10^{-45}$ to $10^5$ Pa. When the oxygen partial pressure is below the above range, binder removal effects may decline. Also, when the oxygen partial pressure is above the range, the internal electrode layer tends to be oxidized.

The other binder removal conditions include: temperature rising rate of preferably 5 to 300° C./hour, more preferably 10 to 100° C./hour; holding temperature of preferably 180 to 400° C., more preferably 200 to 350° C.; and temperature holding time of preferably 0.5 to 24 hours, more preferably 2 to 20 hours. Also, firing atmosphere is preferably air or reducing atmosphere, and it is preferable to use wet mixed gas of $N_2$ and $H_2$ for example as atmospheric gas in the reducing atmosphere.

Atmosphere when firing the green chip can be suitably determined in accordance with a kind of the conductive material in the internal electrode layer paste. In the present embodiment, an oxygen partial pressure in the firing atmosphere is set at more than $1.67 \times 10^{-14}$ atm and less than $9.97 \times 10^{-10}$ atm to control the net valence of Mn and/or Cr. Further preferably, the oxygen partial pressure in the firing atmospheric gas is $1.18 \times 10^{-13}$ atm to $7.90 \times 10^{-11}$ atm.

Too low oxygen partial pressure when firing is not preferable since it causes to excessively lower the net valence of Mn and/or Cr to reduce lifetime. Too high oxygen partial pressure tends to deteriorate aging characteristics due to increased net valence of Mn and/or Cr.

Also, holding temperature when firing is preferably 1100 to 1350° C., further preferably 1240 to 1260° C. When the holding temperature is below the above range, densification may be insufficient. When the holding temperature is above the range, there may be easily occurred electrode breaking due to abnormal sintering of the internal layer electrode, deterioration of capacitance-temperature characteristics due to diffusing of the internal electrode layer constituent materials, and reduction of dielectric ceramic composition.

Other firing conditions includes: temperature rising rate of preferably 50 to 500° C./hour, more preferably 200 to 300° C./hour; temperature holding time of preferably 0.5 to 8 hours, more preferably 1 to 3 hours; and temperature cooling rate of preferably 50 to 500° C./hour, more preferably 200 to 300° C./hour. Also, firing atmosphere is preferably reducing atmosphere, and it is preferable to use wet mixed gas of $N_2$ and $H_2$ for example as atmospheric gas. Hydrogen ($H_2$) concentration and oxygen partial pressure in the atmospheric gas can be changed by adjusting wetter temperature.

When firing in the reducing atmosphere, the capacitor device body is preferably subject to annealing. Annealing is a process to reoxidize the dielectric layer, which significantly extend IR lifetime resulting in improved reliability.

An oxygen partial pressure in the annealing atmosphere is set at more than $5.43 \times 10^{-8}$ atm and less than $3.12 \times 10^{-6}$ atm, further preferably $3.05 \times 10^{-7}$ to $1.34 \times 10^{-6}$ atm, in the present embodiment to control the net valence of Mn and/or Cr.

A holding temperature when annealing is preferably 900 to 1100° C. in the present embodiment to control the net valence of Mn and/or Cr. When the annealing holding temperature is too low, the net valence of Mn and/or Cr may become too small, resulting in reduced lifetime. When the annealing temperature is too high, the net valence of Mn and/or Cr may become large, resulting in reduced lifetime and deteriorated aging characteristics.

Further, too low annealing temperature causes insufficient oxidation of the dielectric layer in general, so that it is easy to lower IR and to reduce IR lifetime. On the other hand, when annealing holding temperature is too high, internal electrode layer may be oxidized to reduce capacitance, and react with dielectric basis material to easily cause deterioration of capacitance-temperature characteristics, lowering of IR and reduction in IR lifetime.

On the other hand, annealing can only consist of temperature rising step and temperature falling step. Namely, temperature holding time can be zero. In this case, the holding temperature is equal to the maximum temperature. Other annealing conditions includes: temperature holding time of preferably 0 to 20 hours, more preferably 2 to 10 hours; and cooling rate of preferably 50 to 500° C./hour, more preferably 100 to 300° C./hour. Also, it is preferable to use wet $N_2$ gas, etc., as annealing atmospheric gas, for example. Namely, hydrogen gas concentration is preferably 0%.

In the above-mentioned binder removal processing, firing and annealing, for example, wetter, etc., may be used to wet $N_2$ gas and mixed gas. In this case, water temperature is preferably 5 to 75° C. or so, particularly preferably around 20° C.

The binder removal processing, firing and annealing can be performed continuously or independently. When performing continuously, it is preferable that the atmosphere is changed without cooling after the binder removal processing, followed by temperature rising to the holding temperature at firing to perform firing; and that the atmosphere is changed to perform annealing after falling temperature to the holding temperature at annealing.

On the other hand, when performing these processing independently, for firing, after temperature is raised to the holding temperature at binder removal processing in a $N_2$ gas or wet $N_2$ gas atmosphere, the atmosphere is preferably changed to continue further raising temperature. After cooling to the holding temperature at annealing, the atmosphere is preferably changed again to $N_2$ gas or wet $N_2$ gas atmosphere to continue cooling. Also, for annealing, the atmosphere may be changed after raising temperature to the holding temperature in a $N_2$ gas or wet $N_2$ gas atmosphere; or the whole annealing process can be done in a wet $N_2$ gas atmosphere.

Thus obtained capacitor element body is subject to end surface polishing, for example by barrel-polishing, sand blasting, etc.; and applying (printing or transferring) the terminal electrode paste including at least Cu powder and glass component followed by baking (firing) processing; to form terminal electrode 4. When baking the terminal electrode paste, the binder removal processing and Cu reduction processing are first performed after drying the paste, and then, the terminal electrode paste is subject to the baking processing, for example, in a mixed gas of $N_2$ and $H_2$ at 700 to 850° C. for about 10 minutes to 1 hour in the present embodiment.

The paste is preferably dried in air, at a temperature of 60 to 150° C., for about 10 minutes to an hour.

The binder removal processing is performed in air; and temperature is raised, for example, at a temperature rising rate of 500 to 1000° C./hour and held at the holding temperature of 400 to 500° C. for about 15 to 60 minutes. Also, Cu reduction is performed in $N_2+H_2$ (5%) atmosphere; a temperature is raised, for example, at temperature rising rate of 500 to 1000° C./hour and held at the holding temperature of 400 to 500° C. for about 15 to 60 minutes.

In the present embodiment, the net valence of Mn and/or Cr in the third subcomponent included in the dielectric layer in the element body after baking processing of the terminal electrode is in a range of 2.2 to 2.4. Too small net valence of Mn and/or Cr after baking processing causes reduction condition, which is not preferable due to a great amount of oxygen defect. On the other hand, too large net valence of Mn and/or Cr frequently causes oxidation of internal electrode and a lack of cations (Ba defect), which is not preferable due to deteriorating of aging characteristics and/or lifetime characteristics. Therefore, by making the net valence of Mn and/or Cr within the range of 2.2 to 2.4, these defects can be prevented.

In the present embodiment, the oxygen partial pressure in atmospheric gas at baking processing is more than $0.1 \times 10^{-6}$ atm and less than $10 \times 10^{-6}$ atm. More preferably, the oxygen partial pressure in atmospheric gas at baking processing is $1 \times 10^{-6}$ atm to $5 \times 10^{-6}$ atm. Further preferably, the oxygen partial pressure in atmospheric gas at baking processing is $1 \times 10^{-6}$ atm to $2 \times 10^{-6}$ atm. When the oxygen partial pressure is too low, the net valence of Mn and/or Cr becomes too small, and lifetime tends to decline. When the oxygen partial pressure is too high, the net valence of Mn and/or Cr is too large, and aging characteristics tends to deteriorate.

In the present embodiment, hydrogen concentration in atmospheric gas is preferably 0.03 to 0.2 vol %, more preferably 0.06 to 0.2 vol % when applying the terminal electrode paste for baking processing. When the hydrogen concentration is too high, the net valence of Mn and/or Cr becomes small, and lifetime tends to decline. When the hydrogen concentration is too low, the net valence of Mn and/or Cr becomes larger, and aging characteristics tends to deteriorate. Therefore, by making the hydrogen concentration within 0.03 to 0.2 vol %, these defects can be prevented.

After that, covering layer is formed on the surface of the terminal electrode 4 by plating, etc., if needed.

Thus produced multilayer ceramic capacitor of the present invention can be mounted on a printed-circuit board by soldering, etc., and used for a variety of electronic systems.

Hereinbefore, an embodiment of the present invention is explained, but the present invention is not at all limited to the embodiment, and can be variously modified without departing from the scope of the present invention.

For example, in the above-mentioned embodiment, a multilayer ceramic capacitor is illustrated as an electronic device according to the present invention, but electronic devices according to the present invention are not limited to a multilayer ceramic capacitor, and may be any having a dielectric layer comprising the above constitution.

EXAMPLES

Next, the present invention will be described further in detail by taking examples to show embodiments of the present invention more specifically. However, the present invention is not limited only to the examples.

Example 1

First, as starting materials to produce dielectric materials, there were prepared a hydrothermal crystallization powder main component material ($BaTiO_3$) with an average particle size of 0.3 μm and first to fourth subcomponent materials with average particle sizes of 0.05 to 0.1 μm.

Carbonates were used as materials for MgO and MnO (first subcomponent: $MgCO_3$, third subcomponent: $MnCO_3$) while oxides were used as other materials (second subcomponent: $(Ba_{0.6}Ca_{0.4})SiO_3$, fourth subcomponent: $Y_2O_3$). Note that the second subcomponent, 0.1 μm of $(Ba_{0.6}Ca_{0.4})SiO_3$, was produced by wet mixing of $BaCO_3$, $CaCO_3$ and $SiO_2$ by a ball mill for 16 hours, firing at 1150° C. in air after drying and wet pulverizing by a ball mill for 100 hours.

When producing $BaTiO_3$ as the main component by weighing 0.1 μm of $BaCO_3$ and 0.1 μm of $TiO_2$ respectively, wet mixing by the ball mill for about 16 hours, and firing at a temperature of 1100° C. in air after drying, followed by wet pulverizing by the ball mill for about 16 hours, similar characteristics were obtained. Also, the main component, $BaTiO_3$, produced by hydrothermal synthesis, oxalate method, etc., showed similar characteristics.

These materials were added to have a composition after firing as shown in Table 1 with respect to 100 moles of the main component, $BaTiO_3$, wet mixed in the ball mill for 16 hours and dried to obtain dielectric materials.

In Table 1, number of moles of oxide of Mg, Ca and Sr as the first subcomponent indicates number of moles of each element. Similarly, number of moles of oxide of transition metal as the third subcomponent indicates number of Moles of each transition metal element. Also similarly, number of moles of oxide of rare earth as the fourth subcomponent indicates number of moles of each rare earth element. Number of moles of $(Ba_{0.6}Ca_{0.4})SiO_3$, the second subcomponent, is, although not shown in the table, 2.0 moles when calculated as a conversion mole of the oxide with respect to 100 moles of $BaTiO_3$, the main component.

Also in Table 1, Mn/Cr, Mn/Co, Mn/Ni and Mn/Fe indicate Mn+Cr, Mn+Co, Mn+Ni and Mn+Fe, respectively. The ratio of Mn to Co, Ni and Fe is 1:1.

Then, 100 parts by weight of the obtained dielectric materials after drying, 4.8 parts by weight of acrylic resin, 100 parts by weight of ethyl acetate, 6 parts by weight of mineral spirits and 4 parts by weight of toluene were mixed in the ball mill to make a paste, so that the dielectric layer paste was obtained. The paste was formed in a sheet with a thickness of 3.0 µm by a doctor blade method to form a green sheet.

Next, 100 parts by weight of Ni particle with an average particle size of 0.3 µm, 40 parts by weight of organic vehicle (obtained by dissolving 8 parts by weight of ethyl cellulose in 92 parts by weight of butyl carbitol) and 10 parts by weight of butyl carbitol were kneaded by a triple roll to make a paste, so that the internal electrode layer paste was obtained. The electrode paste was printed on the above green sheet to form a Ni-electrode film with a thickness of 1.1 µm.

Then, 100 parts by weight of Cu particle with an average particle size of 0.5 µm, 35 parts by weight of organic vehicle (obtained by dissolving 8 parts by weight of ethyl cellulose resin in 92 parts by weight of butyl carbitol) and 7 parts by weight of butyl carbitol were kneaded to make a paste, so that terminal electrode paste was obtained.

Then, using the above dielectric layer paste, a green sheet with a thickness of 3.0 µm was formed on the PET film, and the internal electrode paste was printed thereon to have a thickness of 1.1 µm, followed by removing the green sheet from the PET film. These green sheets and protective green sheet (those without printing the internal electrode layer paste thereon) were stacked to bond by pressure, so that a multilayer body was obtained. The number of stacked sheets having internal electrode was 4.

Then, the multilayer body was cut into a predetermined size to obtain a green chip (an element body before firing). The element body was subject to binder removal processing, firing and annealing to obtain a multilayer ceramic fired body.

The binder removal processing was performed under the following conditions: a temperature rising rate of 15° C./hour, a holding temperature of 280° C., holding time of 8 hours and air atmosphere.

The firing was performed under the following conditions: temperature rising rate of 200° C./hours, holding temperature of 1260° C. (see Table 2), holding time of 2 hours, cooling rate of 300° C./hour and an atmosphere of wet mixed gas of $N_2+H_2$ (see Table 2 for oxygen partial pressure: $4.80\times10^{-12}$ atm). Note that Po2 indicates an oxygen partial pressure with a unit of atm in Table 2. Also in Table 2, D.P indicates dew point temperature of an atmospheric gas, which was 20° C. H2 concentration in Table 2 indicates a hydrogen concentration with a unit of vol %.

The annealing was performed under the following conditions: holding temperature of 1000° C., temperature holding time of 9 hours, cooling rate of 300° C./hour and wet $N_2$ gas atmosphere (oxygen partial pressure of $7.47\times10^{-7}$ atm: see Table 2). Note that the wetter temperature at annealing was 20° C. and hydrogen concentration was 0%. The thickness of the dielectric layer of the obtained multilayer ceramic fired body was 2.2 µm, and the grain size was 0.36 µm. The Ni electrode thickness was 1.0 µm.

Next, end faces of the multilayer ceramic fired body was polished by a sandblast, followed by applying the terminal electrode paste thereon, and subject to the baking processing for forming the terminal electrode, so that a sample of the multilayer ceramic capacitor having a constitution shown in FIG. 1. At baking processing, the temperature was first raised to 500° C. at temperature rising rate of 1000° C./hour and held at 500° C. in air for 10 minutes; after the binder removal processing, the temperature was raised to 500° C. at temperature rising rate of 1000° C./hour and held at 500° C. in $N_2$—$H_2$ (5%) atmosphere for 10 minutes; and after further reduction, the baking processing was performed at 800° C. (Table 2) in $N_2$—$H_2$ (5%) atmosphere for 10 minutes in a belt furnace. On the other hand, as shown in Table 2, the hydrogen concentration at baking processing was 0.06%, and oxygen partial pressure was $2\times10^{-6}$ atm.

The size of thus obtained sample was 3.2 mm×1.6 mm×0.6 mm; the number of the dielectric layers sandwiched by the internal electrode layers was 4; the thicknesses of the dielectric layer and the internal electrode layer were 3.5 to 4.5 µm and 1.0 µm, respectively.

The obtained plurality of capacitor samples 1 to 26 (Table 1) was cut to calculate the net valence of transition metals (Mn, Co, Cr and Fe) included in the dielectric layer in the cut plane by identifying by ESR (electron spin resonance) method and comparing its peak strength with that of the standard sample amount. The results are shown in Table 1.

The ESR measurement conditions were as follows:
measurement device: ESP350E by BRUKER,
measurement temperature: 20K,
central magnetic field: 5000G,
magnetic field sweep: 10000G,
modulation: 100 kHz,
amplitude: 0.5 mT (magnetic field),
microwave: 9.46 GHz and 0.1 mW (energy),
sweep time: 167.772 s×2,
time constant: 81.92 ms,
number of data points: 2048 points and
cavity: TM110, cylindrical shape.

The obtained plurality of capacitor samples 1 to 26 was also evaluated on specific permittivity (∈r), dielectric loss (tan δ), insulation resistance (IR), high temperature accelerated lifetime and aging characteristics. The results are shown in Table 1.

The specific permittivity ∈r was calculated from capacitance of each capacitor sample measured at the reference temperature of 25° C. by a digital LCR meter (4274A by YHP) under measurement conditions of a frequency of 1 kHz and input signal level (measured voltage) of 1.0 Vrms (no unit). The specific permittivity ∈r of 3100 or more was considered to be fine.

The dielectric loss (tan δ) of each capacitor sample was measured at the reference temperature of 25° C. by the digital LCR meter (4274A by YHP) under measurement conditions of a frequency of 1 kHz and input signal level (measured voltage) of 1.0 Vrms. The dielectric loss (tan δ) of 5% or less was considered to be fine.

IR was measured by using variable temperature IR measurement device at ambient temperature with measured voltage of 6.3 V/μm and voltage applied time of 60 s. IR of $1 \times 10^9 \Omega$ or more was considered to be fine.

The high temperature accelerated lifetime (HALT) was evaluated by measuring an average lifetime when the obtained samples were held in an applying state of 20 V/μm of direct voltage at 200° C. In the present examples, the lifetime was defined as a time from starting to apply DC until reducing insulation resistance by one digit. The high temperature accelerated lifetime was measured on 10 capacitor samples. As a criterion for evaluation, HALT of 10 hours or more was considered to be fine while HALT of less than 10 hours was bad.

In the aging test, the obtained samples were subject to applying voltage of 6.3 V at a temperature of 85° C. to measure capacitances before starting and after ending the test (about 1000 hours). The difference in capacitance before and after the test was determined in %.

Specifically, the samples were first subject to heat treatment at 150° C. to 1 hour, and left at ambient temperature for 24 hours to measure capacitance, C0, in 1 Vrm @1 kHz. Then, DC voltage of 6.3 V was applied to the samples in 85° C.-thermostat bath for 1000 hours. 1000 hours later, the samples were taken out of the bath and left at ambient temperature for 24 hours. The capacitance, C1, was measured in 1 Vrm @1 kHz to calculate capacitance change rate by a formula, (C0−C1)/C0×100. The values of the capacitance change rate indicate values of aging characteristics in tables.

The capacitance was measured by the digital LCR meter (4274A by YHP) under measurement conditions of a frequency of 1 kHz and input signal level (measured voltage) of 1.0 Vrms. The change rate within −7% was considered to be fine while those not satisfying −7% were considered to be bad.

In total judgment, samples with favorable evaluation (FINE) both in high temperature accelerated lifetime and aging as well as ∈r of 3100 or more, tan δ of 5% or less and IR of $1 \times 10^9 \Omega$ or more were considered to be fine while those unsatisfying any of the above were considered bad.

TABLE 1

| Sample | (First Subcomponent) Mg | (Third Subcomponent) Transition Metal Mn, Co, Cr, Fe | | (Fourth Subcomponent) Rare Earth Y, Dy, Ho, Er | | (Mg + Transition Metal)/Y | Net Valence of Mn, Co, Cr, Fe | ∈r |
|---|---|---|---|---|---|---|---|---|
| 1 | 0.8 | Mn | 0.1 | Y | 0.5 | 1.8 | 2.19 | 3426 |
| 2 | 0.8 | Mn | 0.25 | Y | 0.5 | 2.1 | 2.31 | 3412 |
| 3 | 0.8 | Mn | 0.5 | Y | 0.5 | 2.6 | 2.34 | 3371 |
| 4 | 0.8 | Mn | 0.75 | Y | 0.5 | 3.1 | 2.45 | 3109 |
| 5 | 0.1 | Mn | 0.25 | Y | 0.5 | 0.7 | 2.19 | 3977 |
| 6 | 0.3 | Mn | 0.25 | Y | 0.5 | 1.1 | 2.26 | 3531 |
| 7 | 0.8 | Mn | 0.25 | Y | 0.5 | 2.1 | 2.31 | 3412 |
| 8 | 1 | Mn | 0.25 | Y | 0.5 | 2.5 | 2.4 | 3122 |
| 9 | 1.5 | Mn | 0.25 | Y | 0.5 | 3.5 | 2.45 | 2910 |
| 10 | 0.8 | Mn | 0.25 | Y | 0.1 | 10.5 | 2.46 | 3387 |
| 11 | 0.8 | Mn | 0.25 | Y | 0.25 | 4.2 | 2.4 | 3429 |
| 12 | 0.8 | Mn | 0.25 | Y | 0.5 | 2.1 | 2.31 | 3412 |
| 13 | 0.8 | Mn | 0.25 | Y | 0.75 | 1.4 | 2.28 | 3378 |
| 14 | 0.8 | Mn | 0.25 | Y | 1 | 1.05 | 2.21 | 3244 |
| 15 | 0.8 | Mn | 0.25 | Y | 1.5 | 0.7 | 2.19 | 3086 |
| 16 | 0.8 | Cr | 0.25 | Y | 0.5 | 2.1 | 2.4 | 3421 |
| 17 | 0.8 | Co | 0.25 | Y | 0.5 | 2.1 | 2.16 | 3549 |
| 18 | 0.8 | Ni | 0.25 | Y | 0.5 | 2.1 | 2 | 3498 |
| 19 | 0.8 | Fe | 0.25 | Y | 0.5 | 2.1 | 2.12 | 3677 |
| 20 | 0.8 | Mn | 0.25 | Dy | 0.5 | 2.1 | 2.33 | 3435 |
| 21 | 0.8 | Mn | 0.25 | Ho | 0.5 | 2.1 | 2.38 | 3352 |
| 22 | 0.8 | Mn | 0.25 | Er | 0.5 | 2.1 | 2.39 | 3311 |
| 23 | 0.8 | Mn/Cr | 0.25 | Y | 0.5 | 2.1 | 2.4 | 3422 |
| 24 | 0.8 | Mn/Co | 0.25 | Y | 0.5 | 2.1 | 2.18 | 3430 |
| 25 | 0.8 | Mn/Ni | 0.25 | Y | 0.5 | 2.1 | 2.14 | 3439 |
| 26 | 0.8 | Mn/Fe | 0.25 | Y | 0.5 | 2.1 | 2.14 | 3507 |

| Sample | tan δ (%) | IR (ohm) | Lifetime 200° C. 20 V/μm | Evaluation ≧10 hr | Aging 85° C.-8.3 V 1000 hr | Evaluation within −7% | Total Judgement |
|---|---|---|---|---|---|---|---|
| 1 | 4.3 | 9.30E+08 | 10.4 | FINE | −5.2 | FINE | BAD |
| 2 | 3.3 | 3.20E+09 | 14.5 | FINE | −6.1 | FINE | FINE |
| 3 | 3.4 | 3.30E+09 | 12.2 | FINE | −6.6 | FINE | FINE |
| 4 | 3.9 | 3.10E+09 | 10.3 | FINE | −7.9 | BAD | BAD |
| 5 | 4.2 | 8.10E+08 | 12 | FINE | −8.3 | BAD | BAD |
| 6 | 3.7 | 2.90E+09 | 18.2 | FINE | −6.8 | FINE | FINE |
| 7 | 3.3 | 3.20E+09 | 14.5 | FINE | −6.1 | FINE | FINE |
| 8 | 3.1 | 3.30E+09 | 12.8 | FINE | −5.5 | FINE | FINE |
| 9 | 2.7 | 3.20E+09 | 10.7 | FINE | −6 | FINE | BAD |
| 10 | 3.9 | 3.10E+09 | 8.8 | BAD | −7.2 | BAD | BAD |
| 11 | 3.7 | 3.30E+09 | 11.9 | FINE | −6.7 | FINE | FINE |
| 12 | 3.3 | 3.20E+09 | 14.5 | FINE | −6.1 | FINE | FINE |
| 13 | 3.3 | 3.20E+09 | 17.2 | FINE | −5.6 | FINE | FINE |

TABLE 1-continued

| | | | | | | | | |
|---|---|---|---|---|---|---|---|---|
| 14 | 3.2 | 3.20E+09 | 19.2 | FINE | −5.3 | FINE | FINE |
| 15 | 3.1 | 3.00E+09 | 20.2 | FINE | −6.3 | FINE | BAD |
| 16 | 3.6 | 2.70E+09 | 11.8 | FINE | −6.6 | FINE | FINE |
| 17 | 4.3 | 6.70E+08 | 6.2 | BAD | −8.2 | BAD | BAD |
| 18 | 4.2 | 1.80E+09 | 7.6 | BAD | −7.7 | BAD | BAD |
| 19 | 5.4 | 3.50E+08 | 1.7 | BAD | −9.2 | BAD | BAD |
| 20 | 3.3 | 3.40E+09 | 15.8 | FINE | −6 | FINE | FINE |
| 21 | 3.2 | 3.20E+09 | 13.1 | FINE | −6.3 | FINE | FINE |
| 22 | 3.2 | 3.00E+09 | 10.6 | FINE | −6.5 | FINE | FINE |
| 23 | 3.6 | 2.90E+09 | 15.6 | FINE | −6.6 | FINE | FINE |
| 24 | 4 | 1.80E+09 | 7.9 | BAD | −7.4 | BAD | BAD |
| 25 | 3.9 | 2.20E+09 | 9.4 | BAD | −7.2 | BAD | BAD |
| 26 | 4.7 | 9.70E+08 | 2.1 | BAD | −8.3 | BAD | BAD |

TABLE 2

| | Firing Atmosphere | | | | Anealing Conditions H2: 0% | | | Terminal Baking Conditions | | |
|---|---|---|---|---|---|---|---|---|---|---|
| Sample | Temp. (°C.) | H2 Conc. (%) | D.P (°C.) | Po2 (atm) | Temp. (°C.) | D.P (°C.) | Po2 (atm) | Temp. (°C.) | H2 Conc. (%) | Po2 × $10^{-5}$ (atm) |
| 1-26 48-65 | 1260 | 3 | 20 | 4.80E−12 | 1000 | 20 | 7.47E−07 | 800 | 0.06 | 2 |

TABLE 3

| | Firing Atmosphere | | | | Anealing Conditions H2: 0% | | | Terminal Baking Conditions | | |
|---|---|---|---|---|---|---|---|---|---|---|
| Sample | Temp. | H2 Conc. (%) | D.P (°C.) | Po2 (atm) | Temp. (°C.) | D.P (°C.) | Po2 (atm) | Temp. (°C.) | H2 Conc. (%) | Po2 BAD$10^{-6}$ (atm) |
| 27 | 1260 | 3 | 20 | 4.80E−12 | 1000 | 20 | 7.47E−07 | 800 | 1 | 0.01 |
| 28 | 1260 | 3 | 20 | 4.80E−12 | 1000 | 20 | 7.47E−07 | 800 | 0.8 | 0.1 |
| 29 | 1260 | 3 | 20 | 4.80E−12 | 1000 | 20 | 7.47E−07 | 800 | 0.2 | 1 |
| 30 | 1260 | 3 | 20 | 4.80E−12 | 1000 | 20 | 7.47E−07 | 800 | 0.06 | 2 |
| 31 | 1260 | 3 | 20 | 4.80E−12 | 1000 | 20 | 7.47E−07 | 800 | 0.03 | 5 |
| 32 | 1260 | 3 | 20 | 4.80E−12 | 1000 | 20 | 7.47E−07 | 800 | 0 | 10 |
| 33 | 1260 | 3 | 20 | 4.80E−12 | 1200 | 20 | 6.08E−06 | 800 | 0.08 | 2 |
| 34 | 1260 | 3 | 20 | 4.80E−12 | 1100 | 20 | 2.30E−08 | 800 | 0.08 | 2 |
| 35 | 1260 | 3 | 20 | 4.80E−12 | 1000 | 20 | 7.47E−07 | 800 | 0.08 | 2 |
| 36 | 1260 | 3 | 20 | 4.80E−12 | 900 | 20 | 2.00E−07 | 800 | 0.08 | 2 |
| 37 | 1260 | 3 | 20 | 4.80E−12 | 800 | 20 | 4.20E−08 | 800 | 0.08 | 2 |
| 35a | 1260 | 3 | 20 | 4.80E−12 | 1000 | −30 | 5.43E−08 | 800 | 0.08 | 2 |
| 35b | 1260 | 3 | 20 | 4.80E−12 | 1000 | 0 | 3.05E−07 | 800 | 0.08 | 2 |
| 35c | 1260 | 3 | 20 | 4.80E−12 | 1000 | 20 | 7.47E−07 | 800 | 0.08 | 2 |
| 35d | 1260 | 3 | 20 | 4.80E−12 | 1000 | 35 | 1.34E−06 | 800 | 0.08 | 2 |
| 35e | 1260 | 3 | 20 | 4.80E−12 | 1000 | 80 | 3.12E−08 | 800 | 0.08 | 2 |
| 38 | 1260 | 5 | −30 | 1.67E−14 | 1000 | 20 | 7.47E−07 | 800 | 0.08 | 2 |
| 39 | 1260 | 5 | 0 | 1.18E−13 | 1000 | 20 | 7.47E−07 | 800 | 0.08 | 2 |
| 40 | 1260 | 3 | 20 | 4.80E−12 | 1000 | 20 | 7.47E−07 | 800 | 0.08 | 2 |
| 41 | 1260 | 1 | 35 | 7.90E−11 | 1000 | 20 | 7.47E−07 | 800 | 0.08 | 2 |
| 42 | 1260 | 0.5 | 35 | 9.97E−10 | 1000 | 20 | 7.47E−07 | 800 | 0.08 | 2 |

| Sample | Net Valance of Mn — | εr — | tan δ (%) | IR (ohm) | Lifetime 200° C. 20 V/μm | Evaluation ≧10 hr | Aging 65° C- 6.3 V 1000hr | Evaluation within −7% | Total Judge- ment — |
|---|---|---|---|---|---|---|---|---|---|
| 27 | 2.11 | 3421 | 4.9 | 4.50E+08 | 7.9 | BAD | −5.8 | FINE | BAD |
| 28 | 2.19 | 3419 | 4.3 | 9.70E+08 | 8 | BAD | −5.8 | FINE | BAD |
| 29 | 2.29 | 3413 | 3.6 | 2.40E+09 | 14.2 | FINE | −6 | FINE | FINE |
| 30 | 2.31 | 3412 | 3.3 | 3.20E+09 | 14.5 | FINE | −6.1 | FINE | FINE |
| 31 | 2.4 | 3412 | 3.4 | 3.20E+09 | 14.9 | FINE | −6.7 | FINE | FINE |
| 32 | 2.49 | 3410 | 3.5 | 3.00E+09 | 15.8 | FINE | −8.3 | BAD | BAD |
| 33 | 2.51 | 3217 | 3.1 | 3.60E+09 | 7.8 | BAD | −7.3 | BAD | BAD |
| 34 | 2.4 | 3444 | 3.2 | 3.40E+09 | 12.6 | FINE | −6.1 | FINE | FINE |
| 35 | 2.31 | 3412 | 3.3 | 3.20E+09 | 14.9 | FINE | −6.1 | FINE | FINE |

TABLE 3-continued

| | | | | | | | | | |
|---|---|---|---|---|---|---|---|---|---|
| 36 | 2.21 | 3406 | 4.3 | 2.70E+09 | 15.8 | FINE | −5.8 | FINE | FINE |
| 37 | 2.18 | 3437 | 5.8 | 3.10E+08 | 8.8 | BAD | −5.7 | FINE | BAD |
| 35a | 2.19 | 3419 | 5.2 | 4.10E+08 | 7.8 | BAD | −5.3 | FINE | BAD |
| 35b | 2.27 | 3417 | 3.6 | 3.00E+09 | 10.6 | FINE | −6 | FINE | FINE |
| 35c | 2.31 | 3412 | 3.3 | 3.20E+09 | 14.5 | FINE | −6.1 | FINE | FINE |
| 35d | 2.36 | 3420 | 3.2 | 3.20E+09 | 13.2 | FINE | −6.6 | FINE | FINE |
| 35e | 2.44 | 3488 | 3.3 | 3.10E+09 | 11.7 | FINE | −7.5 | BAD | BAD |
| 38 | 2.19 | 3427 | 5.9 | 2.40E+08 | 8 | BAD | −4.3 | FINE | BAD |
| 39 | 2.27 | 3413 | 3.8 | 2.40E+09 | 18.8 | FINE | −6 | FINE | FINE |
| 40 | 2.31 | 3412 | 3.3 | 3.20E+09 | 14.5 | FINE | −6.1 | FINE | FINE |
| 41 | 2.39 | 3376 | 3.4 | 3.20E+08 | 11.3 | FINE | −6.7 | FINE | FINE |
| 42 | 2.48 | 3361 | 3.5 | 3.00E+09 | 7.1 | FINE | −8.3 | BAD | BAD |

As shown in Table 1, by comparing the samples 1 to 4, it was confirmed that the net valence of Mn as a transition metal was changed as changing number of moles of Mn. It was also confirmed that the net valence of Mn was in the range of 2.2 to 2.4 when number of moles of Mn was preferably more than 0.1 mole and less than 0.75 mole, more preferably 0.25 to 0.5 mole, with respect to 100 moles of the main component, resulting in well-balanced improvements in both lifetime characteristics and aging characteristics. Note that the sample 1 fell into BAD in the total judgment due to the IR of $1\times10^9\Omega$ or less.

It was confirmed that change in number of moles of Mg caused to change the net valence of Mn as a transition metal by comparing the samples 5 to 9. It was also confirmed that the net valence of Mn was in the range of 2.2 to 2.4 when number of moles of Mg was preferably more than 0.1 mole and less than 1.5 moles, more preferably 0.3 to 1 mole, with respect to 100 moles of the main component, resulting in well-balanced improvements in both lifetime characteristics and aging characteristics.

It was confirmed that change in number of moles of Y caused to change the net valence of Mn as a transition metal by comparing the samples 10 to 15. It was also confirmed that the net valence of Mn was in the range of 2.2 to 2.4 when number of moles of Y was preferably more than 0.1 mole and less than 1.5 moles, more preferably 0.25 to 1 mole, with respect to 100 moles of the main component, resulting in well-balanced improvements in both lifetime characteristics and aging characteristics.

Note that similar results can be obtained when using Dy, Ho or Er instead of Y as with when using Y, as shown in the samples 20 to 22.

Also, by comparing the samples 1 to 15, it was confirmed that the net valence of Mn was in the range of 2.2 to 2.4 when the mole ratio (Mg+Mn+Cr)/Re was more than 0.7 and 4.2 or less, preferably 1.05 to 4.2, resulting in well-balanced improvements in both lifetime characteristics and aging characteristics.

Note that the sample 4 contained too much Mn as the third subcomponent (0.75 mole). As a result, (Mg+Mn+Cr)/Re was 3.1, and the net valence of Mn exceeded 2.4 (2.45), resulting in inferior aging characteristics. Therefore, the sample 4 was not preferable.

The sample 9 contained too much Mg as the first subcomponent (1.5 moles). As a result, (Mg+Mn+Cr)/Re was 3.5, and the net valence of Mn exceeded 2.4 (2.45), resulting in the specific permittivity ∈r less than 3100. Therefore, the sample 9 was not preferable.

By comparing samples 16 to 19 and 23 to 26, it was confirmed that similar results were obtained when using Cr or Mn+Cr instead of Mn as with when using Mn. Note that lifetime characteristics and aging characteristics both deteriorated when using other transition metals (Co, Ni or Fe) instead of Mn or Cr, compared with the case of using Mn or Cr.

Example 2

Except for changing conditions for firing atmosphere, annealing or terminal baking as shown in Table 3, capacitor samples were produced as with the samples 2, 7 and 12 of Example 1 (Table 1 and Table 2), and similarly evaluated. The results are shown in Table 3

As shown in Table 3, by comparing the samples 27 to 32, it was confirmed that the net valence of Mn was within the range of 2.2 to 2.4 when the oxygen partial pressure in the atmospheric gas at applying the terminal electrode paste and baking processing was more than $0.1\times10^{-6}$ atm and less than $10\times10^{-6}$ atm, further preferably $1\times10^{-6}$ atm to $5\times10^{-6}$ atm, resulting in well-balanced improvements in both lifetime characteristics and aging characteristics. It was also confirmed that when the hydrogen concentration was 0.03 to 0.2 vol % in the atmospheric gas at applying the terminal electrode paste and baking processing, lifetime characteristics and aging characteristics were both improved in a balanced manner.

By comparing the samples 33 to 37, it was confirmed that the net valence of Mn was within the range of 2.2 to 2.4 when the annealing temperature was 900 to 1100° C., resulting in well-balanced improvements in both lifetime characteristics and aging characteristics.

By comparing the samples 35a to 35e, it was confirmed that the net valence of Mn was within the range of 2.2 to 2.4 when the oxygen partial pressure in the annealing atmospheric gas was more than $5.43\times10^{-8}$ atm and less than $3.12\times10^{-6}$ atm, further preferably $3.05\times10^{-7}$ to $1.34\times10^{-6}$ atm, resulting in well-balanced improvements in both lifetime characteristics and aging characteristics.

By comparing the samples 38 to 42, it was confirmed that the net valence of Mn was within the range of 2.2 to 2.4 when the oxygen partial pressure in the firing atmospheric gas was more than $1.67\times10^{-14}$ atm and less than $9.97\times10^{-10}$ atm, further preferably $1.18\times10^{-13}$ to $7.90\times10^{-11}$ atm, resulting in well-balanced improvements in both lifetime characteristics and aging characteristics.

Example 3

Except for using Cr as the third subcomponent as shown in Table 4, capacitor samples were produced as with the samples of Example 1 (Table 1 and Table 2), and similarly evaluated. The results are shown in Table 4.

TABLE 4

| Sample | Composition (First Subcomponent) Mg | (Third Subcomponent) Transition | (Fourth Subcomponent) Rare Earth Y, Dy, Ho, Er | | (Mg + Cr)/Y | Net Valance of Cr | εr |
|---|---|---|---|---|---|---|---|
| 48 | 0.8 | 0.1 | Y | 0.5 | 1.8 | 2.19 | 3400 |
| 16 | 0.8 | 0.25 | Y | 0.5 | 2.1 | 2.4 | 3388 |
| 50 | 0.8 | 0.5 | Y | 0.5 | 2.6 | 2.4 | 3345 |
| 51 | 0.8 | 0.75 | Y | 0.5 | 3.1 | 2.45 | 3083 |
| 52 | 0.1 | 0.25 | Y | 0.5 | 0.7 | 2.18 | 3951 |
| 53 | 0.3 | 0.25 | Y | 0.5 | 1.1 | 2.3 | 3505 |
| 16 | 0.8 | 0.25 | Y | 0.5 | 2.1 | 2.4 | 3386 |
| 55 | 1 | 0.25 | Y | 0.5 | 2.5 | 2.4 | 3133 |
| 56 | 1.5 | 0.25 | Y | 0.5 | 3.5 | 2.42 | 2684 |
| 57 | 0.8 | 0.25 | Y | 0.1 | 10.5 | 2.42 | 3361 |
| 58 | 0.8 | 0.25 | Y | 0.25 | 4.2 | 2.4 | 3403 |
| 16 | 0.8 | 0.25 | Y | 0.5 | 2.1 | 2.4 | 3386 |
| 60 | 0.8 | 0.25 | Y | 0.75 | 1.4 | 2.36 | 3352 |
| 61 | 0.8 | 0.25 | Y | 1 | 1.05 | 2.26 | 3218 |
| 62 | 0.8 | 0.25 | Y | 1.5 | 0.7 | 2.19 | 3060 |
| 63 | 0.8 | 0.25 | Dy | 0.5 | 2.1 | 2.4 | 3409 |
| 64 | 0.8 | 0.25 | Ho | 0.5 | 2.1 | 2.4 | 3328 |
| 65 | 0.8 | 0.25 | Er | 0.5 | 2.1 | 2.4 | 3285 |

| Sample | tan δ (%) | IR (ohm) | Lifetime 200° C. 20 V/μm | Evaluation ≧10 hr | Aging 85° C.-6.3 V 1000 hr | Evaluation within −7% | Total Judgement |
|---|---|---|---|---|---|---|---|
| 48 | 4.1 | 9.31E+08 | 9.1 | FINE | −5.5 | FINE | BAD |
| 16 | 3.4 | 3.49E+08 | 12.2 | FINE | −6.4 | FINE | FINE |
| 50 | 3.4 | 3.60E+09 | 10.5 | FINE | −6.8 | FINE | FINE |
| 51 | 3.8 | 3.38E+09 | 9 | BAD | −8.1 | BAD | BAD |
| 52 | 4.0 | 8.84E+08 | 10.3 | FINE | −8.5 | BAD | BAD |
| 53 | 3.7 | 3.18E+09 | 15.1 | FINE | −7 | FINE | FINE |
| 16 | 3.4 | 3.49E+09 | 12.2 | FINE | −6.4 | FINE | FINE |
| 55 | 3.2 | 3.80E+09 | 10.9 | FINE | −5.8 | FINE | FINE |
| 56 | 2.9 | 3.48E+09 | 9.3 | BAD | −6.3 | FINE | BAD |
| 57 | 3.8 | 3.38E+09 | 7.9 | BAD | −7.5 | BAD | BAD |
| 58 | 3.7 | 3.60E+09 | 10.2 | FINE | −7 | FINE | FINE |
| 16 | 3.4 | 3.49E+09 | 12.2 | FINE | −6.4 | FINE | FINE |
| 60 | 3.4 | 3.49E+09 | 14.3 | FINE | −5.9 | FINE | FINE |
| 61 | 3.3 | 3.49E+09 | 15.9 | FINE | −5.6 | FINE | FINE |
| 62 | 3.2 | 3.27E+09 | 16.6 | FINE | −6.6 | FINE | BAD |
| 63 | 3.4 | 3.71E+09 | 13.2 | FINE | −6.3 | FINE | FINE |
| 64 | 3.3 | 3.49E+09 | 11.2 | FINE | −6.6 | FINE | FINE |
| 65 | 3.3 | 3.27E+09 | 10.6 | FINE | −8.8 | FINE | FINE |

As shown in Table 4, by comparing the samples 48 to 51, it was confirmed that the net valence of Cr as a transition metal was changed as changing number of moles of Cr. It was also confirmed that the net valence of Cr was 2.4 (within the range of 2.2 to 2.4) when number of moles of Cr was preferably more than 0.1 mole and less than 0.75 mole, further preferably 0.25 to 0.5 mole, with respect to 100 moles of the main component, resulting in well-balanced improvements in both lifetime characteristics and aging characteristics. Note that the sample 48 fell into BAD in the total judgment due to the IR of $1\times10^9\Omega$ or less.

By comparing the samples 52 to 56, it was confirmed that the net valence of Cr as a transition metal was changed as changing number of moles of Mg. It was also confirmed that the net valence of Cr was 2.3 to 2.4 (within the range of 2.2 to 2.4) when number of moles of Mg was preferably more than 0.1 mole and less than 1.5 moles, further preferably 0.3 to 1 mole, with respect to 100 moles of the main component, resulting in well-balanced improvements in both lifetime characteristics and aging characteristics. Note that the sample 52 fell into BAD in the total judgment due to the IR of $1\times10^9\Omega$ or less.

By comparing the samples 57 to 62, it was confirmed that the net valence of Cr as a transition metal was changed as changing number of moles of Y. It was also confirmed that the net valence of Cr was 2.36 to 2.4 (within the range of 2.2 to 2.4) when number of moles of Y was preferably more than 0.1 mole and less than 1.5 moles, further preferably 0.25 to 1 mole, with respect to 100 moles of the main component, resulting in well-balanced improvements in both lifetime characteristics and aging characteristics. Note that the sample 62 fell into BAD in the total judgment due to the specific permittivity Er less than 3100.

Note that similar results can be obtained when using Dy, Ho or Er instead of Y as with when using Y as shown in the samples 63 to 65.

Also, by comparing the samples 48 to 65, it was confirmed that the net valence of Cr was in the range of 2.36 to 2.4 (within the range of 2.2 to 2.4) when the mole ratio (Mg+Mn+Cr)/Re was more than 0.7 and 4.2 or less, preferably 1.05 to 4.2, resulting in well-balanced improvements in both lifetime characteristics and aging characteristics.

Note that the sample 48 contained too little Cr as the third subcomponent (0.1 mole). As a result, (Mg+Mn+Cr)/Re was 1.8, and the net valence of Cr was less than 2.2 (2.19), resulting in the IR less than $1\times10^9\Omega$. Therefore, the sample 48 was not preferable.

Also, the sample 51 contained too much Cr as the third subcomponent (0.75 mole). As a result, (Mg+Mn+Cr)/Re was 3.1, and the net valence of Cr exceeded 2.4 (2.45), resulting in the specific permittivity ∈r less than 3100. Therefore, the sample 51 was not preferable.

Also, the sample 56 contained too much Mg as the first subcomponent (1.5 moles). As a result, (Mg+Mn+Cr)/Re was 3.5, and the net valence of Cr exceeded 2.4 (2.42), resulting in lower specific permittivity ∈r and inferior in lifetime characteristics. Therefore, the sample 56 was not preferable.

Example 4

In Example 4, the composition of the third subcomponent, each content of the first to fourth subcomponent, hydrogen concentration and oxygen partial pressure at baking processing of the terminal electrode were changed to those shown in Table 5. Except for the above, capacitor samples were produced as with the samples of Example 1 (Table 1 and Table 2), and similarly evaluated. The results are shown in Table 5.

TABLE 5

| | | Composition | | | | | |
|---|---|---|---|---|---|---|---|
| Sample | (First Subcomponent) Mg | (Third Subcomponent) Transition Metal Mn, Cr | | (Fourth Subcomponent) Rare Earth Y | (Mg + Mn + Cr)/Y | H2 Conc. (%) | Po2 BAD$10^{-6}$ (atm) | Net Valence of Mn or Cr — |
| 66 | 0.8 | Cr | 0.25 | 0.5 | 2.1 | 0.8 | 0.1 | 2.18 |
| 67 | 0.8 | Cr | 0.25 | 0.5 | 2.1 | 0.2 | 1 | 2.32 |
| 68 | 0.8 | Cr | 0.25 | 0.5 | 2.1 | 0.08 | 2 | 2.4 |
| 69 | 0.8 | Cr | 0.25 | 0.5 | 2.1 | 0.03 | 5 | 2.48 |
| 70 | 0.8 | Cr | 0.25 | 0.5 | 2.1 | 0 | 10 | 2.52 |
| 71 | 0.8 | Mn | 0.5 | 0.5 | 2.8 | 0.8 | 0.1 | 2.19 |
| 72 | 0.8 | Mn | 0.5 | 0.5 | 2.8 | 0.2 | 1 | 2.27 |
| 73 | 0.8 | Mn | 0.5 | 0.5 | 2.8 | 0.08 | 2 | 2.34 |
| 74 | 0.8 | Mn | 0.5 | 0.5 | 2.8 | 0.03 | 5 | 2.39 |
| 75 | 0.8 | Mn | 0.5 | 0.5 | 2.8 | 0 | 10 | 2.48 |
| 76 | 0.3 | Mn | 0.25 | 0.5 | 1.1 | 0.8 | 0.1 | 2.18 |
| 77 | 0.3 | Mn | 0.25 | 0.5 | 1.1 | 0.2 | 1 | 2.23 |
| 78 | 0.3 | Mn | 0.25 | 0.5 | 1.1 | 0.08 | 2 | 2.26 |
| 79 | 0.3 | Mn | 0.25 | 0.5 | 1.1 | 0.03 | 5 | 2.38 |
| 80 | 0.3 | Mn | 0.25 | 0.5 | 1.1 | 0 | 10 | 2.42 |
| 81 | 1 | Mn | 0.25 | 0.5 | 2.5 | 0.8 | 0.1 | 2.19 |
| 82 | 1 | Mn | 0.25 | 0.5 | 2.5 | 0.2 | 1 | 2.32 |
| 83 | 1 | Mn | 0.25 | 0.5 | 2.5 | 0.08 | 2 | 2.4 |
| 84 | 1 | Mn | 0.25 | 0.5 | 2.5 | 0.03 | 5 | 2.48 |
| 85 | 1 | Mn | 0.25 | 0.5 | 2.5 | 0 | 10 | 2.53 |
| 86 | 0.8 | Mn | 0.25 | 0.25 | 4.2 | 0.8 | 0.1 | 2.19 |
| 87 | 0.8 | Mn | 0.25 | 0.25 | 4.2 | 0.2 | 1 | 2.33 |
| 88 | 0.8 | Mn | 0.25 | 0.25 | 4.2 | 0.08 | 2 | 2.4 |
| 89 | 0.8 | Mn | 0.25 | 0.25 | 4.2 | 0.03 | 5 | 2.47 |
| 90 | 0.8 | Mn | 0.25 | 0.25 | 4.2 | 0 | 10 | 2.53 |
| 91 | 0.8 | Mn | 0.25 | 1 | 1.05 | 0.8 | 0.1 | 2.18 |
| 92 | 0.8 | Mn | 0.25 | 1 | 1.05 | 0.2 | 1 | 2.2 |
| 93 | 0.8 | Mn | 0.25 | 1 | 1.05 | 0.08 | 2 | 2.21 |
| 94 | 0.8 | Mn | 0.25 | 1 | 1.05 | 0.03 | 5 | 2.3 |
| 95 | 0.8 | Mn | 0.25 | 1 | 1.05 | 0 | 10 | 2.42 |

| Sample | ∈r — | tan δ (%) | IR (ohm) | Lifetime 200° C. 20 V/μm hr | Evaluation ≧10 hr | Aging 85° C.-6.3 V 1000 hr | Evaluation within −7% | Total Judgement — |
|---|---|---|---|---|---|---|---|---|
| 66 | 3393 | 4.1 | 9.84E+08 | 9.2 | BAD | −8.1 | FINE | BAD |
| 67 | 3387 | 3.8 | 2.82E+09 | 13.6 | FINE | −8.3 | FINE | FINE |
| 68 | 3388 | 3.4 | 3.28E+09 | 14.6 | FINE | −8.4 | FINE | FINE |
| 69 | 3388 | 3.4 | 3.29E+09 | 15.6 | FINS | −7.3 | BAD | BAD |
| 70 | 3384 | 3.5 | 3.28E+09 | 16.6 | FINE | −8.5 | BAD | BAD |
| 71 | 3382 | 4.0 | 9.90E+09 | 8.8 | BAD | −8.2 | FINE | BAD |
| 72 | 3382 | 3.4 | 2.87E+09 | 10.9 | FINE | −8.4 | FINE | FINE |
| 73 | 3371 | 3.4 | 3.30E+09 | 12.2 | FINE | −8.8 | FINE | FJNE |
| 74 | 3373 | 3.3 | 3.30E+09 | 12.3 | FINE | −8.9 | FINEI | FINE |
| 75 | 3373 | 3.3 | 4.21 E+09 | 12.8 | FINE | −8 | BAD | BAD |
| 76 | 3556 | 4.5 | 7.30E−08 | 9.2 | BAD | −8.1 | FINE | BAD |
| 77 | 3549 | 3.9 | 2.03E+09 | 12.2 | FINE | −8.4 | FINE | FINE |
| 78 | 3531 | 3.7 | 2.90E+09 | 18.2 | FINE | −8.8 | FINE | FINE |
| 79 | 3533 | 3.8 | 3.10E+09 | 19.9 | FINE | −7 | FINE | FINE |
| 80 | 3538 | 3.8 | 3.83E+09 | 21.2 | FINE | −7.9 | BAD | BAD |
| 81 | 3130 | 3.4 | 9.95E+08 | 9.9 | BAD | −4 | FINE | BAD |
| 82 | 3124 | 3.2 | 3.03E+09 | 11.7 | FINE | −4.8 | FINE | [FINE |
| 83 | 3122 | 3.1 | 3.30E+09 | 12.8 | FINE | −5.5 | FINE | FINE |
| 84 | 3120 | 3.0 | 3.71E+09 | 13.5 | FINE | −7 | BAD | SAD |
| 85 | 3133 | 3.0 | 3.72E+09 | 15.1 | FINE | −8.8 | BAD | BAD |

TABLE 5-continued

| | | | | | | | | |
|---|---|---|---|---|---|---|---|---|
| 86 | 3435 | 4.0 | 7.86E+08 | 6.1 | BAD | −5.4 | FINE | BAD |
| 87 | 3428 | 3.8 | 1.24E+09 | 10.2 | FINE | −6.2 | FINE | FINE |
| 88 | 3429 | 3.7 | 3.30E+09 | 11.9 | FINE | −6.7 | FINE | FINE |
| 89 | 3430 | 3.8 | 3.60E+09 | 12.4 | FINE | −7.4 | BAD | BAD |
| 90 | 3439 | 3.4 | 3.67E+09 | 12.8 | FINE | −9.3 | BAD | BAD |
| 91 | 3251 | 3.6 | 9.97E+08 | 9.9 | BAD | −4.4 | FINE | BAD |
| 92 | 3248 | 3.2 | 2.87E+09 | 13.2a | FINE | −4.7 | FINE | FINE |
| 93 | 3244 | 3.2 | 3.20E+09 | 19.2 | FINE | −6.3 | FINE | FINE |
| 94 | 3241 | 3.1 | 3.66E+09 | 22.4 | FINE | −6.8 | FINS | FINE |
| 95 | 3250 | 3.2 | 3.82E+09 | 28.3 | FINE | −7.7 | BAD | BAD |

As shown in Table 5, by comparing the samples 66 to 95, it was confirmed that the net valence of Mn or Cr was within the range of 2.2 to 2.4 when the oxygen partial pressure in the atmospheric gas at applying the terminal electrode paste and baking processing was more than $0.1 \times 10^{-6}$ atm and less than $10 \times 10^{-6}$ atm, further preferably $1 \times 10^{-6}$ atm to $5 \times 10^{-6}$ atm. It was also confirmed that the net valence of Mn or Cr was within the range of 2.2 to 2.4 when the hydrogen concentration in the atmospheric gas at applying the terminal electrode paste and baking processing was 0.03 to 0.2 vol %, preferably 0.06 to 0.2 vol %. Further, it was confirmed that lifetime characteristics and aging characteristics were both improved in a balanced manner when the net valence of Mn or Cr was within the range of 2.2 to 2.4.

Example 5

Except for using an oxide of Ca instead of Mg oxide as the first subcomponent, capacitor samples were produced as with Example 1 (samples 5 to 9 in Table 2), and similarly evaluated. The results are shown in Table 6.

ably more than 0.1 mole and less than 1.5, further preferably 0.3 to 1 mole, with respect to 100 moles of the main component, resulting in well-balanced improvements in both lifetime characteristics and aging characteristics.

Also, it was confirmed that the net valence of Mn was in the range of 2.2 to 2.4 when the mole ratio (Xl+Mn)/Re was more than 0.7 and less than 3.5 (more preferably 1.1 to 2.5), resulting in well-balanced improvements in both lifetime characteristics and aging characteristics.

Example 6

The number of moles of $(Ba_{0.6}Ca_{0.4})SiO_3$ as the second subcomponent was changed to those shown in Table 7 with respect to 100 moles of $BaTiO_3$ as the main component. Except for the above, capacitor samples were produced as with the samples 2, 7 and 12 of Example 1 (Table 1 and Table 2), and similarly evaluated. The results are shown in Table 7.

TABLE 6

| | Composition | | | | Net Valence of | |
|---|---|---|---|---|---|---|
| | (First Subcomponent) | (Third Subcomponent) Transition Metal | (Fourth Subcomponent) Rare Earth | | Mn | $\epsilon r$ |
| Sample | X1 = Ca | Mn | Y | (X1 + Mn)/Y | — | — |
| 96 | Ca | 0.1 | 0.25 | 0.5 | 0.7 | 2.18 | 3905 |
| 97 | Ca | 0.3 | 0.25 | 0.5 | 1.1 | 2.24 | 3494 |
| 98 | Ca | 0.8 | 0.25 | 0.5 | 2.1 | 2.29 | 3385 |
| 99 | Ca | 1.0 | 0.25 | 0.5 | 2.5 | 2.38 | 3208 |
| 100 | Ca | 1.5 | 0.2S | 0.5 | 3.5 | 2.45 | 2923 |

| Sample | tan δ (%) | IR (ohm) | Lifetime 200° C. 20 V/μm | Evaluation ≧10 hr | Aging 85° C.-6.3 V 1000 hr | Evaluation within −7% | Total Judgement |
|---|---|---|---|---|---|---|---|
| 96 | 4.1 | 7.9E+08 | 9.4 | BAD | −8.8 | BAD | BAD |
| 97 | 3.6 | 2.8E+09 | 15.8 | FINE | −6.7 | FINE | FINE |
| 98 | 3.2 | 3.2E+09 | 13.8 | FINE | −5.8 | FINE | FINE |
| 99 | 3.1 | 3.2E+09 | 10.8 | FINE | −5.8 | FINE | FINE |
| 100 | 2.8 | 3.1E+09 | 8.8 | BAD | −8.4 | FINE | BAD |

As shown in Table 6, by comparing the samples 96 to 100, it was confirmed that the net valence of Mn as a transition metal was changed as changing number of moles of Ca. It was also confirmed that the net valence of Mn was within the range of 2.2 to 2.4 when number of moles of Ca was prefer- The content of each subcomponent in all the samples of Example 6 (Table 7) was the first subcomponent: Mg of 0.8 mole, the third subcomponent: Mn of 0.25 mole, and the fourth subcomponent: Y of 0.5. Also, the mole ratio (Mg+Mn)/Y was 2.1

TABLE 7

| Sample | Composition (Second Subcomponent) $(Ba_{0.5}Ca_{0.4})SiO_3$ | Net Valence of Mn — | $\epsilon r$ — | tan δ (%) | IR (ohm) | Lifetime 200° C. 20 V/μm hr | Evaluation ≧10 | Aging 85° C.-6.3 V 1000 hr | Evaluation within −7% | Total Judgment — |
|---|---|---|---|---|---|---|---|---|---|---|
| 111 | 0.5 | 2.39 | 3512 | 3.9 | 7.2E+08 | 8.9 | FINE | −7.2 | BAD | BAD |
| 112 | 1.0 | 2.31 | 3689 | 4 | 3.0E+09 | 11.8 | FINE | −6.6 | FINE | FINE |
| 113 | 2.0 | 2.31 | 3412 | 3.3 | 3.2E+09 | 14.5 | FINE | −6.1 | FINE | FINE |
| 114 | 3.0 | 2.31 | 3211 | 3.1 | 3.3E+09 | 12.6 | FINE | −5.3 | FINE | FINE |
| 115 | 4.0 | 2.28 | 3044 | 2.97 | 3.0E+08 | 10.4 | FINE | −5.5 | FINE | BAD |

As shown in the samples 111 to 115 in Table 7, it was confirmed that the net valence of Mn was within the range of 2.2 to 2.4 when number of moles of $(Ba_{0.6}Ca_{0.4})SiO_3$ as the second subcomponent was preferably 1 to 3 moles with respect to 100 moles of the main component, resulting in well-balanced improvements in both lifetime characteristics and aging characteristics.

The invention claimed is:

1. An electronic device comprising an element body having an dielectric layer composed of dielectric composition, and a terminal electrode formed on an exterior of said element body, wherein said dielectric constituent is comprises:
   main component including barium titanate;
   a first subcomponent including at least one oxide of Mg and Ca;
   a second subcomponent including SiO2;
   a third subcomponent including at least one oxide of Mn and Cr; and
   a forth subcomponent including oxide of rare earth elements; wherein the net valence of Mn and/or Cr among said third subcomponent is in the range of 2.2 to 2.4.

2. The electronic device as set forth in claim 1 wherein a ratio of said first subcomponent to said fourth subcomponent compared to 100 moles of said main component is;
   the first subcomponent: larger than 0.1 mole and smaller than 1.5 moles (note that a number of moles of the first subcomponent is the number of moles converted in each element),
   the second subcomponent: 1 to 3 moles,
   the third subcomponent : larger than 0.1 mole and smaller than 0.75 mole (note that a mole number of the third subcomponent is the number of moles converted in each element),
   the fourth subcomponent: larger than 0.1 mole and smaller than 1.5 moles (note that a mole number of the fourth subcomponent is the number of moles converted in each rare earth elements).

3. The electronic device as set forth in claim 2 wherein;
   at least one of an element Mg and Ca included in said first component is set to Xl,
   an element included in said fourth subcomponent in said rare earth element is set to Re, and
   when a mole ratio of Xl, Mn, and Cr mole number compared to a mole number of Re is expressed in (Xl+Mn+Cr)/Re, the (Xl+Mn+Cr)/Re is larger than 0.7 and equal to or less than 4.2.

4. The electronic device as set forth in claim 1, wherein the rare earth element in said fourth subcomponent is selected from at least one of Y, Dy, Ho, and Er.

5. The electronic device as set forth in claim 1 wherein;
   a glass composition of said second subcomponent is expressed in a chemical formula MxSiO3, which M from said chemical formula includes at least one from Ba, Ca, Sr, Li, and B, and x is in the range of ⅔ to 2.

6. The electronic device as set forth in claim 1 comprising multilayer ceramic capacitor wherein,
   an internal electrode layer and said dielectric layer are stacked alternately inside said element body, and
   an arbitrary pair of said internal electrode layer facing each other via said dielectric layer are connected to each of said pair of terminal electrode formed on the external of said element body.

7. A method of production of the electronic device as set forth in claim 1 comprising steps of;
   firing said element body,
   annealing said element body after firing.

8. The method of production as set forth in claim 7 wherein the temperature of firing said element body is 1110~1350° C., and
   an oxygen partial pressure in a firing atmospheric gas is larger than 1.67×10−14 atm and smaller than 9.97×10−10 atm.

9. The method of production as set forth in claim 8, wherein the temperature when annealing said element body is 900 to 1100° C., and
   the oxygen partial pressure of annealing atmospheric gas is larger than 5.43×10−8 atm and smaller than 3.12×10−6 atm.

10. The method of production of forming the terminal electrode to the electronic device as set forth in claim 7, wherein the terminal electrode is formed by applying a terminal electrode paste and bake on to the external of said element body after annealing step.

11. The method of production of the electronic device as set forth in claim 10, wherein said terminal electrode paste contains Cu powders and glass composition.

12. The method of production of the electronic device as set forth in claim 10, wherein the temperature of baking after applying the terminal electrode paste is 700 to 850° C.

13. The method of production of the electronic device as set forth in claim 10, wherein a partial pressure oxygen of atmospheric gas is larger than 0.1×10−6 atm and smaller than 10×10−16 atm when baking after applying the terminal electrode paste.

14. The method of production of the electronic device as set forth in claim 10, wherein the hydrogen concentration in the atmospheric gas is 0.03 to 0.2 vol % when baking after applying the terminal electrode paste.

* * * * *